April 3, 1973   R. M. A. T. DE MONTIGNY ET AL   3,725,193
PROCESS AND APPARATUS FOR THE CHEMICAL REACTION
BETWEEN A GAS AND A WOOD PULP
Filed May 27, 1970   5 Sheets-Sheet 1

INVENTORS
RAIMBAULT M.A.T. de MONTIGNY
NORMAN LIEBERGOTT
DERRICK P. W. POUNDS

BY *Millen Raptes & White*

ATTORNEYS

United States Patent Office 3,725,193
Patented Apr. 3, 1973

3,725,193
PROCESS AND APPARATUS FOR THE CHEMICAL REACTION BETWEEN A GAS AND A WOOD PULP
Raimbault M. A. T. de Montigny, Baie d'Urfe, Quebec, Norman Liebergott, Laval, Quebec, and Derrick P. W. Pounds, Beaconsfield, Quebec, Canada, assignors to Pulp and Paper Research Institute of Canada, Pointe Claire, Quebec, Canada
Filed May 27, 1970, Ser. No. 40,961
Claims priority, application Canada, Nov. 26, 1969, 68,411
Int. Cl. D21c 9/00
U.S. Cl. 162—17                       19 Claims

ABSTRACT OF THE DISCLOSURE

Process and apparatus are provided for simultaneously comminuting wood pulp and contacting such comminuted wood pulp with a suitable reagent gas, namely, $ClO_2$ or $NH_3$, so that reaction may take place between the wood pulp and the gas, with or without prior heating of the comminuted wood pulp, there being cooperation between the comminuting members in the apparatus comprising a cylindrical housing and a slotted outlet from the apparatus to discharge the reacted wood pulp without restraining the wood pulp while it is being comminuted, a portion of the bottom of said housing which provides said outlet being flattened to represent, in cross-section, the chord of a circle. This minimizes the production of compacted comminuted wood pulp.

---

BACKGROUND OF THE INVENTION

(1) Field of the invention

This invention relates to a method and apparatus for effecting rapid chemical reaction between gaseous and solid reagents. More particularly, it relates to a method and apparatus suitable for effecting rapid chemical reaction between gaseous reagents and fibrous vegetable matter. Still more particularly, it relates to a method and apparatus suitable for effecting rapid chemical reaction between wood pulp and a suitable gaseous reagent, namely, one which is either capable of substantially instantaneous reaction with, or which is substantially instantaneously absorbed by, the wood pulp, for example ammonia or $ClO_2$ diluted with steam or a non-reactive gas to a partial pressure of chlorine dioxide which is not more than 100 mm. of Hg.

(2) Description of the prior art

In heterogeneous reactions between a gas and a solid, the rate of reaction is limited by the time required for the gas to diffuse or percolate into and through the mass of solid. This rate of reaction can be increased by increasing the specific surface of the solid by comminution prior to reaction. It can also be increased by reducing the bulk density of the solid mass and facilitating the penetration of the gas into it. It can further be increased by accelerating the penetration of the gas into or through the solid mass by the impression of a gas pressure differential. Still another method of increasing reaction rate consists in keeping the comminuted solid in a state of agitation by flowing the gas at such a velocity with respect to the solid as to keep the solid particles in suspension as in a fluidized bed. Alternatively, the comminuted solid may be kept in a state of agitation by mechanical means while in the presence of the gas. Finally, the rate of reaction can usually be increased by increasing the reaction temperature.

In order to realize fully the advantages of the gas phase reaction in a multi-stage bleaching of cellulosic fibrous pulp, the comminution of the pulp to produce the fluffed pulp must be of a specific nature so as to produce fragments which independent of their size are of low density, of porous structure throughout and substantially free from any highly compressed portions, i.e. compacted fibre bundles. Only when this form of comminuted pulp is achieved can the gaseous reactants reach all parts of the comminuted pulp fragments and thus ensure that the reaction of the gaseous reagent with the fluffed pulp proceeds rapidly and uniformly.

Existing apparatus for carrying out the comminution of the high consistency cellulosic fibrous pulp to form a fluffed pulp either (a) support the pulp to be comminuted on a stationary member and the material is subjected to the action of moving members which move past and in close proximity to the stationary members thereby comminuting the material primarily by shear or (b) entrain the pulp to be comminuted between two sets of members one or both of which may be moving in close juxtaposition to one another and between which the pulp is subjected to shear. With both types of apparatus the pulp, in addition to being subjected to shear, is also subjected to some measure of localized very high pressure due to the small clearances between the shearing members. This compressive action is deleterious, since at least a portion of the comminuted cellulosic pulp is highly compacted, i.e. in the form of highly compacted fibre bundles and thereby impervious to the gaseous reagent and is also difficult to re-disperse in water. Rapid chemical reaction between such pulp and gaseous reagents is not generally possible.

SUMMARY OF THE INVENTION

(1) Aims of the invention

An object of one broad aspect of the present invention is to provide both a method and an apparatus for carrying out rapid chemical reactions between vegetable matter and gaseous reagents while comminuting such fibrous vegetable matter to porous, uncompacted fibre aggregates.

An object of another aspect of this invention is to provide both a method and an apparatus for substantially simultaneously mechanically forming and maintaining the comminuted, porous, uncompacted fibre aggregates in a state of agitation for the length of time required for reaction with a suitable reagent gas.

An object of a further aspect of this invention is to provide both a method and an apparatus for contacting the comminuted, porous, uncompacted fibre aggregates while they are substantially simultaneously mechanically formed and maintained in a state of agitation with a suitable reagent gas for a time sufficient to effect reaction.

An object of a still further aspect of this invention is to provide both a method and an apparatus for preheating the comminuted, porous, uncompacted fibre aggregates prior to, or substantially simultaneously with, contacting these with the reagent gas.

(2) Broad statements of the invention

The present invention provides a method and apparatus for simultaneously comminuting a solid (e.g. wood pulp) to be reacted, mechanically maintaining the particles of the comminuted solid in a state of agitation and contacting such comminuted and agitated solid with a suitable reagent gas, namely, one which is either capable of substantially instantaneous reaction with, or which is substantially instantaneously absorbed by, wood pulp, so that reaction may take place between the solid and the gas, with or without prior heating of the comminuted solid.

By a broad aspect of this invention, then, an improvement is provided in a substantially instantaneous reaction between chemical pulp and gaseous $NH_3$ or gaseous $ClO_2$. The improved process comprises four essential steps. The first step involves introducing the pulp into an apparatus comprising a cylindrical housing; a rotating shaft longitudinally and rotatably mounted in the housing, the shaft having a plurality of longitudinally spaced-apart breaker members extending therefrom; pulp inlet means for introducing the pulp into the housing adjacent the top thereof; inlet means for introducing the gaseous reagent into a fluffing zone in the housing adjacent the breaker members; and outlet means for removal of comminuted reacted fluffed pulp adjacent the bottom thereof, a portion of the bottom of the housing which provides such outlet means being flattened to represent, in cross-section, the chord of a circle, such flattened portion being provided with a plurality of longitudinally spaced slots extending circumferentially around the bottom of said housing, such breaker members extending radially outwardly beyond such spaced slots, the pulp being introduced for substantially free-falling linear movement in the same direction as the linear peripheral movement of the breaker members, but at a velocity less than the linear peripheral velocity of said breaker members. The second step involves introducing the gaseous reagent into the fluffing zone. The third step involves substantially simultaneously (i) comminuting the pulp so as to have a low density, substantially uncompacted, porous, fluffed structure and (ii) contacting the pulp with the gaseous reagent in the fluffing zone at the first area of contact between the breaker members and the free-falling pulp where both the pulp and the breaker members are moving linearly downwardly. The fourth and final step involves discharging the reacted pulp from the apparatus by cooperation between the spaced apart breaker members and the slotted outlet means while substantially inhibiting the restraining of the pulp while the pulp is being contacted with the breaker members, thereby to minimize the production of compacted pulp material.

By another aspect of this invention, an improvement is provided, in an apparatus for substantially simultaneously comminuting a cellulosic fibrous pulp to form particles of a fluffed pulp having a low density, substantially uncompacted structure and reacting said fluffed pulp with a gaseous reagent. The apparatus comprises a cylindrical housing and a shaft longitudinally and rotatably mounted in the housing, the shaft having a plurality of longitudinally spaced-apart breaker members extending therefrom. Pulp inlet means are provided for introducing the pulp into the housing adjacent the top thereof. Inlet means are provided for introducing the gaseous reagent into the housing adjacent said breaker members. Finally, outlet means are provided for removal of comminuted reacted fluffed pulp adjacent the bottom thereof, a portion of the bottom of the housing providing the outlet means being flattened to represent, in cross-section, the chord of a circle, said flattened portion being provided with a plurality of longitudinally spaced slots extending circumferentially around the bottom of said housing. The breaker members extend radially outwardly beyond said spaced slots. The spaced-apart breaker members co-operating with the slotted outlet means to discharge the reacted pulp from the apparatus while substantially inhibiting the restraining of the pulp while the pulp is being contacted with the breaker members, thereby to minimize the production of compacted pulp material.

The term "low density, substantially uncompacted, porous, fluffed structure" in reference to the solid reagent, e.g. a fibrous cellulosic pulp is intended to be embraced by the art accepted terminology "fibrous clusters or fluffed up flocs" e.g. as set forth in Strong, U.S. Pat. No. 3,074,-842 issued Jan. 22, 1963, particularly as applied to chemical pulps, and especially as set forth in assignee's U.S. Pat. No. 3,630,828 issued Dec. 28, 1971. In other words, the fibers remain substantially undamaged or unbroken even while retaining their natural springiness, so that each such cluster represents a spongy structure that is resiliently compressible and can be readily and substantially instantaneously penetrated by a treatment gas adapted to react substantially instantaneously with the respective non-cellulosic matter on the fibers.

For example, as will be described hereinafter, if $NH_3$ or $ClO_2$ diluted with steam or a non-reactive gas to a partial pressure of chlorine dioxide not more than 100 mm. of Hg is applied in its gaseous state to a pulp in the manner of this invention, reaction is consummated within a contact time that may be in the order of mere fractions of a second.

The above term also is intended to define the product obtained by fragmentation of a chemical cellulosic pulp into fibre and fibre aggregates or flocks, substantially each discrete fibre aggregate or flock being produced without substantially compressed portions so that each discrete fibre aggregate or flock is readily gas permeable. Each of the fibre aggregates or flocks is usually an average of one-eighth to one inch in diameter and presents a fluffed-up, dried appearance even with about 40 to 80% moisture in the cellulosic pulp. The density of fluffed cellulosic pulp varies with moisture content and degree of fluffing, i.e. at 30% consistency the density varies between 5 and 15 lb. per cu. ft. The reference herein to "fluffing" of the chemical cellulosic pulp is directed to a process of producing this pulp, the fragmentation being effected by a device which contacts the cellulosic pulp in an unsupported condition with moving members without any substantial local compression of the cellulosic pulp, such fluffed pulp has a density of 5–15 lb. per cu. ft. at 30% consistency and is substantially uncompacted, (i.e., little or no fibre bundles).

(3) Detailed embodiments of the invention

According to one embodiment of the process of the present invention, the pulp has a high consistency of more than about 15%, e.g. between about 15 and about 60%.

According to other preferred embodiments of this invention, the gaseous reagent is $ClO_2$, diluted with steam or a non-reactive gas to a partial pressure of $ClO_2$ which is not more than 100 mm. of Hg, or is gaseous ammonia diluted with steam, air or other diluent gas.

In one embodiment of the apparatus of this invention, the pulp inlet means comprises a spout extending substantially the full length of the housing.

In another of such embodiments of this apparatus, the outlet means further comprises a plurality of longitudinally spaced slots extending circumferentially around the bottom portion of the apparatus, the width of the slots being adjustable by means of a sleeve member located adjacent the bottom of the housing, the sleeve member being adapted to move longitudinally of the housing and having a plurality of longitudinally spaced slots therein arranged to cooperate with the slots in the housing.

In still another such embodiment of this apparatus, a portion of the bottom providing the outlet means is in the form of a relatively large opening, the opening being provided with a plurality of spaced apart grate bars, thereby to provide a plurality of longitudinally spaced slots extending circumferentially around the bottom portion of the apparatus. Preferably, the grate bars are vertically adjustable with respect to the outlet means.

In the latter two embodiments, the chordal line is approximately 25°–35° to the horizontal, the discharge opening being offset to the side wall thus obtaining a maximum centrifugal effect which assists the discharge action.

In any of the embodiments above described, the rotatable shaft may be hollow and may then be provided with gaseous reagent inlet means thereinto and with a plurality of longitudinally and circumferentially spaced-apart outlet apertures.

Finally, in any of the embodiments above described, the reacted comminuted pulp outlet may be discharged into the pulp inlet means of a second and preferably similar apparatus, connected in series therewith.

The gaseous reactant inlet means for any of the embodiments hereinabove described suitably comprises an inlet line provided with a flow control valve.

The outlet means for any of the embodiments hereinabove described optionally includes a discharge device which simultaneously provides a seal against the free escape of reagent gas. Examples include the well-known and conventional rotary valves, or the rotating locks or sluices disclosed in Swedish Pat. No. 166,221 published Feb. 10, 1959, in the name of A. B. Kamyr.

The process of an aspect of the present invention is one in which the pulp, in low density, substantially uncompacted, porous fluffed form, is contacted substantially simultaneously as it is being so fluffed, with a suitable gaseous reagent. This may desirably be the alkaline extraction in the second and/or the fourth stages in a five stage CEDED sequence, or the chlorine dioxide oxidation, the third or fifth stages in a five stage CEDED sequence.

In one example, to obtain the intermediate product comminuted cellulosic fibrous pulp in accordance with an aspect of the present invention, for immediate use in one stage of a multi-stage bleaching process, the cellulosic fibrous pulp, in particular, wood pulp, is passed at a consistency of more than 15%, in particular, at a consistency between 15 and 60%, if necessary having previously been dewatered to this consistency, to a comminuting apparatus, as opposed to the conventional disc or hammer mills. In this comminuting apparatus the high consistency pulp is unsupported and is broken up by contact with radial spaced breaker arms attached to a rotary shaft without any substantial local compression of the pulp and thus without the formation of compacted fibre bundles. The pulp is substantially simultaneously comminuted and reacted with a suitable gaseous reagent, for example, gaseous chlorine dioxide diluted with steam or a non-reactive gas to a partial pressure of chlorine dioxide not more than 100 mm. of Hg, or a suitable mixture containing chlorine dioxide diluted with steam or a non-reactive gas to a partial pressure of chlorine dioxide not more than 100 mm. of Hg.

The improved fluffed pulp is used substantially immediately in the process of the present invention in any of the stages of the multistage bleaching process for the production of a bleached fibrous cellulosic pulp using a high consistency pulp of at least 15% consistency and a suitable gaseous reagent. In particular, the pulp may be used in the initial oxidation treatment of the washed pulp from the cooking stage of the kraft, soda or sulphite process in which the pulp is contacted at a consistency of at least 15% with gaseous chlorine dioxide diluted with steam or a non-reactive gas to a partial pressure of chlorine dioxide not more than 100 mm. of Hg, or with a suitable mixture containing chlorine dioxide diluted with steam or a non-reactive gas to a partial pressure of chlorine dioxide of not more than 100 mm. of Hg.

Alternatively, the pulp, after it has been subjected to a chlorine bleaching step, may be extracted with a suitable alkaline reagent, for example, ammonia-steam, ammonia-hot air, or ammonia hot air-steam.

Other pulp treating procedures, described in detail in Canadian patent application Ser. No. 019,673 filed May 10, 1968, now Canadian Pat. No. 869,267 issued Apr. 27, 1971, and United States patent application Ser. No. 728,633 filed May 13, 1968, now U.S. Pat. No. 3,630,828 issued Dec. 28, 1971, may be modified by the process of an aspect of this invention, the only criterion being that the fluffed pulp is substantially simultaneously formed and reacted with a suitable gaseous reagent.

DESCRIPTION OF PREFERRED EMBODIMENTS (1) Brief description of the drawings

The present invention will be further illustrated, by way of the accompanying drawings, in which.

(2) Detailed description of the drawings

One apparatus for the substantially simultaneous comminution of the fibrous vegetable matter and reaction with a suitable gaseous reagent is a modification of the apparatus suited for the comminution of fibrous vegetable matter to porous, uncompacted fibre aggregates which has been described in Canadian application No. 019,673 filed May 10, 1968 now Canadian Pat. No. 869,267 issued Apr. 27, 1971. This apparatus is shown and described in FIGS. 1 and 2 which follow hereinafter.

Figure 1:
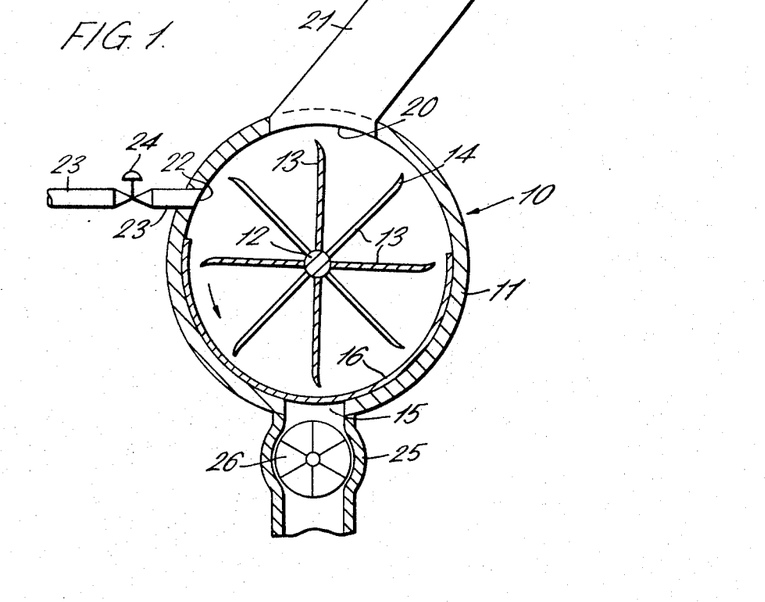
FIG. 1 is a central vertical section of an apparatus according to one embodiment of this invention for carrying out a process according to one aspect of this invention.
Figure 2:
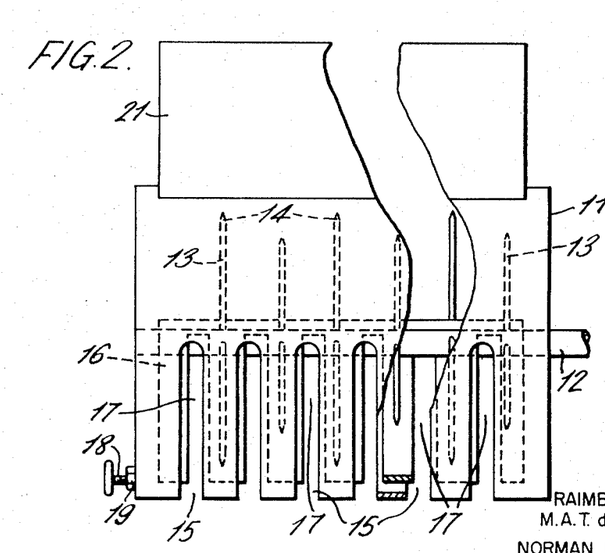
FIG. 2 is a side elevation, partially broken away, of the comminuting segment of the apparatus shown in FIG. 1, with certain parts removed for clarity.

Referring to FIGS. 1 and 2, the apparatus 10 includes a drum housing 11 having, rotatably mounted axially thereof, a shaft 12 driven by an electric motor (not shown). Mounted on the shaft 12 are a plurality of circomferentially and longitudinally spaced breaker members 13, which are suitably in the form of spikes which may be straight or curved in the direction of motion or which may have straight and curved portions. The ends 14 of the spikes 13 may be suitably pointed to enhance the breaking action upon the high consistency wood pulp introduced into the drum housing 11. Alternatively, satisfactory breaking action is achieved when the spikes 13 are square end rods. The drum housing 11 is closed at each end by means of end walls (not shown) containing bearings (not shown) in order to support the shaft 12. The drum housing 11 is provided with a plurality of longitudinally spaced, circumferentially extending, slots 15 covering approximately the lower half of the circumference thereof. In contact with the inner surface of the housing 11 and covering an arc at least as great as that of the slots 15 is a slidable sleeve 16 having slots 17 therein which are about as wide as the slots 15 in the housing 11 with approximately the same center-to-center spacing. A threaded rod 18 protruding through one of the end walls of the housing 11 and fitted with a threaded nut 19 is present to move the sleeve 16 longitudinally with respect to said housing 11 to alter the relative positions of the slots 15 and 17 and thereby vary the width of the slots communicating the interior with the exterior of the housing 11.

The housing 11 has an opening 20 at the top thereof to receive a feed spout 21 which preferably extends substantially the full length of the housing 11 and is also preferably inclined to the vertical to prevent comminuted pulp being flung back from the interior of the housing any distance up the spout 21.

The housing 11 is also provided with a reagent feed aperture 22 to which is attached a gaseous reagent feed line 23, provided with a metering valve 24.

At the bottom of the housing 11 and connected to the discharge of the slotted apertures 15 is a discharge chute 25. The discharge chute 25 is provided with a conventional discharge device 26 to provide a seal against the free escape of reagent gas. Although device 26 is shown to be a rotary valve, any equivalent device which will provide a sealing action may be substituted therefor.

The dimensions of the apparatus and of all its parts will vary with the throughput of treated pulp required. To increase capacity, it is preferable to increase the length of the device rather than its diameter. The diameter of the housing 11 may conveniently vary from about 6 to 24 inches and its length may suitably vary from a few inches to several feet. The diameter of the spikes 13 is preferably kept as small as possible having regard to their mechanical strength and rigidity and will be suitably between 3/16 and 3/4 of an inch. The length of the spikes 13 will depend upon the maximum size of fragments desired and will be such as to provide a clearance between their tips and the inside periphery of the sleeve 16. This clearance will normally be between about 1/8 and an inch. The width of the slots 15 and 17 in the housing 11 of the sleeve 16 respectively depends upon the maximum size of the fragments desired but will seldom exceed an inch. The width of the lands or solid portion 151, 171 between adjacent slots 17, respectively, is not critical, but is preferably a minimum commensurate with the structural strength of the device to permit maximum facility of discharge of comminuted fluffed pulp. Since the minimum effective slot width is determined by the position of the sleeve 16 with respect to the housing 11, the width of the slots 15 and 17 themselves can be substantially larger than the maximum size of the fluffed comminuted reacted pulp desired, but it will seldom be less than 1/4 of an inch. The exact location and disposition of the spikes 13 on the shaft 12 are not critical and are subject to wide variation. However, a preferred arrangement is one in which the spikes 13 rotating in adjacent planes are spaced not more than the maximum size of pulp fragment desired. Obviously, the arrangement of the spikes 13 should be such that the spike-shaft assembly is dynamically balanced. Although the shaft 12 has been shown in the drawings as concentric with the housing 11, this is not critical and the center line of the shaft 12 need not coincide with the center line of the housing 11. If it does not, the center line of the shaft 12 is preferably located on the vertical center line and below the horizontal center line of the housing 11.

The speed of rotation of the shaft 12 and spikes 13 should be such that the linear peripheral speed of the tips 14 of the spikes 13 will be sufficient to effect the desired comminution action, which will depend on the pulp being treated, but will usually be in the range of 1,500 feet per minute to about 6,000 feet per minute.

In operation, the pulp to be comminuted is fed via the spout 21 in the form of a continuous web, cakes, sheets or large fragments in the housing 11. As the pulp enters the housing 11 although unsupported, its inertia is such that only a small portion thereof can accelerate sufficiently rapidly to be carried along at the speed of the tips 14 of the spikes 13. The spikes 13 therefore tear through the pulp carrying forward only a small quantity at their own speed. Although, by virtue of this same inertia, some compaction of the pulp occurs at the point of impact of the spikes 13, since the pulp is unsupported, this compaction is slight and unobjectionable. Substantially simultaneously with the tearing action by the spikes 13, there is the reaction on the comminuted pulp by the gaseous reagent fed through line 23.

Fragments of pulp larger than the maximum desired size which may escape the first impact of the spikes 13 will fall to the bottom of the housing 11 where they will subsequently be impacted by the same or adjacent spikes and be substantially simultaneously further fragmented until they are reduced to a size small enough to drop through the slots 15 in the housing 11 and be reacted upon by gaseous reagent and be discharged from the apparatus 10 through discharge duct 25. The substantially simultaneous reaction and comminuting action on the pulp is extremely important in the process of the present invention and the fragments produced must be of low density and of uniformly porous structure and have undergone as little compaction as possible. In the prior apparatus, the pulp being supported on a fixed member at the moment of comminution or otherwise squeezed between coacting members is subjected to undesirable compaction and is unsuitable for uniform and rapid subsequent reaction with the gaseous reagent.

The apparatus described above is suitable for effecting reaction between a solid and a gas where the time of reaction is very short, i.e., in the order of a few seconds or less.

Figure 3:
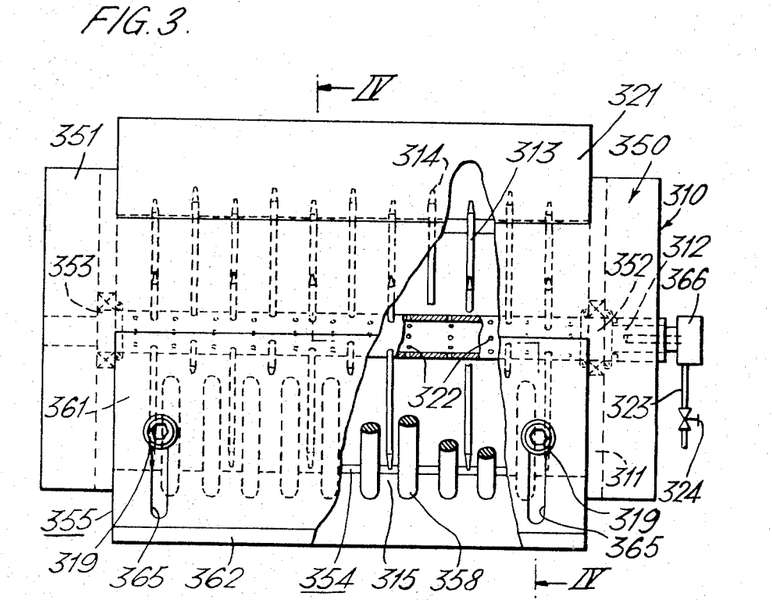
FIG. 3 is a side elevational view, partially broken away, of the comminuting segment of one modification of the aparatus of FIG. 1, with certain parts removed for clarity.
Figure 4:
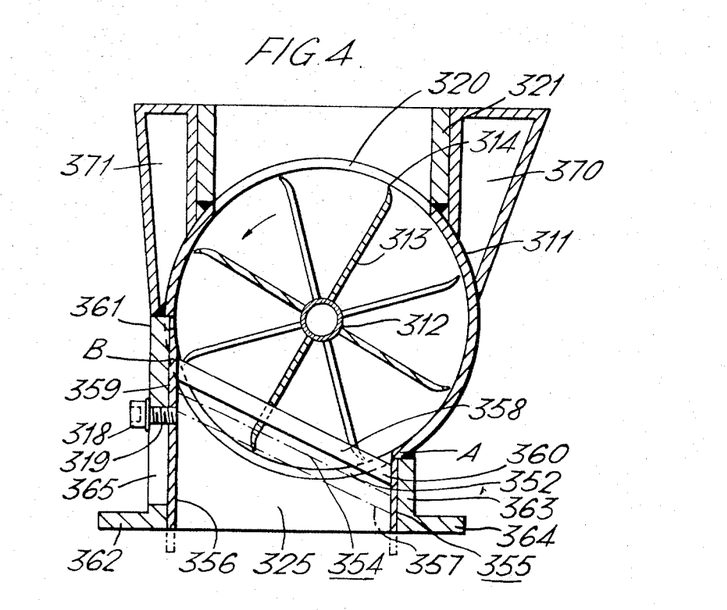
FIG. 4 is a stepped central vertical section, along the line IV—IV of FIG. 3.

Referring now to FIGS. 3 and 4, the apparatus 310 includes a drum housing 311 having rotatably mounted axially thereof, a hollow shaft 312 driven by an electric motor (not shown). Mounted on the hollow shaft 312 are a plurality of circumferentially and longitudinally spaced breaker members 313, which are suitably in the form of spikes which may be all straight, or have pointed ends, or have square ends, or have both straight and curved portions. The ends 314 of the spikess 313 may be suitably pointed to enhance the breaking action upon the high consistency wood pulp introduced into the drum housing 311. The drum housing 311 is closed at each end by means of end walls 350, 351 containing bearings 352, 353 in order to support the hollow shaft 312. The upper portions of the drum housing 311 are provided with steam cavities 370, 371 into which steam may be injected in order to preheat the apparatus if required. The drum housing 311 is provided with an opening 354 in which is placed a grate structure, indicated generally by reference numeral 355. Opening 354 is preferably disposed in the third and fourth quadrants and, as seen in FIG. 4, extends from point B in the third quadrant to point A in the fourth quadrant, and subtends an angle, preferably, of about 25–35° to the horizontal. The grate 355 includes a generally rectangular main wall 356 and a generally rectangular auxiliary wall 357. A plurality of paralled spaced-apart grate bars 358 are connected between the top 359 of wall 356 and the top 360 of wall 357. The slope of grate bars 358 is approximately 25–35° to the horizontal. It will be seen, therefore, that the grates 358 provide a plurality of longitudinally spaced, circumferentially extending, slots 315 covering approximately the lower half of the circumference thereof.

Welded to the third quadrant area of the housing 311 is a generally rectangular front plate 361 having a flange 362 thereon and, similarly, welded to the fourth quadrant of the housing 311 is a generally rectangular rear plate 363 having a flange 364 thereon. The grate structure 355 is slidably adjustably mounted between plates 361, 363 and may be secured in a preselected position by means of threaded bolts 318 which pass through adjustment slots 365 and into tapped apertures 319 in plate 356. By these means, it is possible to move the grate 355 vertically with respect to said housing 311 to alter the relative positions of the slots 315 from the tips 314 of the breaker arms 313 and thereby vary the effective size of the slots communicating the interior with the exterior of the housing 311.

The housing 311 has an opening 320 at the top thereof to receive a feed spout 321 which preferably extends substantially the full length of the housing 311. Opening 320 may be either centrally located or be offset.

The hollow shaft 312 is provided with a terminal ring seal 370 leading to a gas inlet 373 which is attached to a gaseous reagent feed line 323, which is provided with a metering valve 324, by means of rotary seal 366. Hollow shaft 312 is also provided with a plurality of longitudinally and circumferentially spaced reagent feed apertures 322. The feed means provides intimate contact of the gaseous reagent with the pulp as it is being fluffed.

By means of the grate structure 355 at the bottom of the housing 311, there is provided a discharge chute 325. While not shown in FIGS. 3 and 4, the discharge chute 325 is connected to a discharge chute 25 as in FIGS. 1 and 2, which likewise is provided with a conventional discharge device 26 to provide a seal against the free escape of reagent gas. Although device 26 is shown to be a rotary valve, any equivalent device which will provide a sealing action may be substituted therefor.

The dimensions of the apparatus and of all its parts will vary with the throughput of treated pulp required, and, since this has been fully described with reference to FIGS. 1 and 2, no further description will be given here.

The vertical position of the grate bars 358 with respect to the housing 311 depends upon the maximum size of the fragments desired but will seldom exceed an inch. The width of the grate bars 358 between adjacent slots 315 is not critical, but is preferably a minimum commensurate with the structural strength of the device to permit maximum facility of discharge of cominuted fluffed pulp. When the breaker arms 313 are tapered, and since the effective slot size is determined by the position of the grate member 355 with respect to the housing 311, the grate member 355 can be raised substantially so that the tip 314 of the breaker members 313 should extend beyond the grate bars 358, e.g. by an amount up to one and one-quarter inches.

The speed of rotation of the shaft 312 and spikes 313 should be such that the linear peripheral speed of the tips 314 of the spikes 313 will be sufficient to effect the desired comminution action, which will depend on the pulp being treated, but will usually be in the range 1,500 feet per minute to about 6,000 feet per minute.

In operation, the pulp to be comminuted is fed via the spout 321 in the form of a continuous web, cakes, sheets or large fragments in the housing 311. As the pulp enters the housing 311 although it is unsupported, its inertia is such that only a small portion thereof can accelerate sufficiently rapidly to be carried along at the speed of the tips 314 of the spikes 313. The spikes 313 therefore tear through the pulp carrying forward only a very small quantity at their own speed. Although, by virtue of this same inertia, some compaction of the pulp occurs at the point of impact of the spikes 313, since the pulp is unsupported, this compaction is slight and unobjectionable. Substantially simultaneously with the tearing action by the spikes 313, there is the reaction on the comminuted pulp by the gaseous reagent fed through apertures 322 via hollow shaft 312 and line 323. This substantially simultaneous reaction and comminuting action on the pulp is extremely important in the process of the present invention and the fragments produced must be of low density and of uniformly porous structure and have undergone as little compaction as possible. In the prior apparatus, the pulp, being supported on a fixed member at the moment of comminution or otherwise squeezed between coacting members, is subjected to undesirable compaction and is unsuitable for uniform and rapid subsequent reaction with the gaseous reagent.

It is readily seen that the reacted pulp is discharged from the apparatus by cooperation between the spaced apart breaker members 313 and the slotted outlet means 354. The breaker members extend radially outwardly beyond grate bars 358 at the outlet 354, and so positively urge the reacted pulp from the apparatus. This inhibiting of the restraining of the pulp by positively discharging the pulp takes place while the pulp is initially being contacted with the breaker members. This minimizes the production of compacted pulp material.

The apparatus described above is suitable for effecting reaction between a solid and a gas where the time of reaction is very short, i.e., in the order of a few seconds or less and, in fact, preferably is substantially instantaneous.

Figure 5:
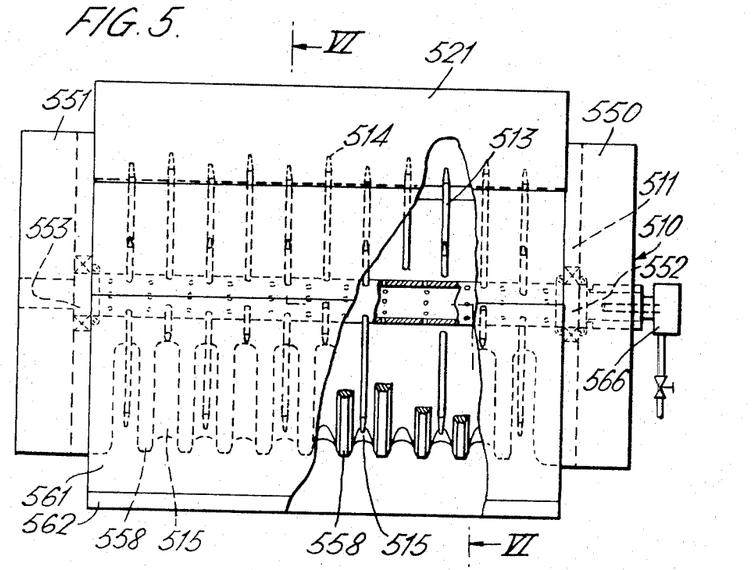
FIG. 5 is a side elevational view, partially broken away, of the comminuting segment of a second modification of the apparatus of FIG. 1, with certain parts removed for clarity.
Figure 6:
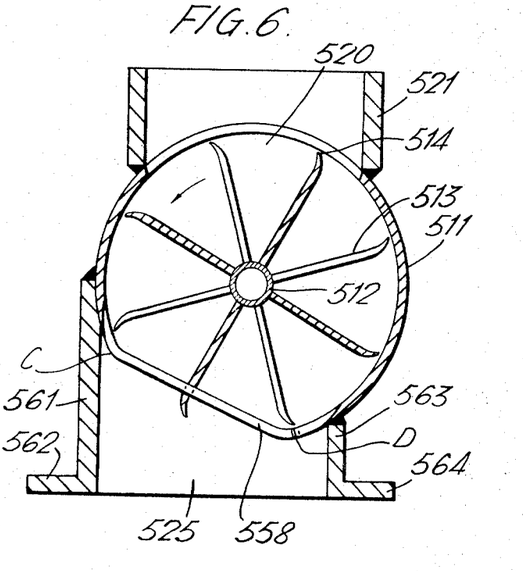
FIG. 6 is a stepped, central vertical section along the line VI—VI of FIG. 5.

Referring now to FIGS. 5 and 6, the apparatus 510 includes a drum housing 511 having, rotatably mounted axially thereof, a hollow shaft 512 driven by an electric motor (not shown). Mounted on the hollow shaft 512 are a plurality of circumferentially and longitudinally spaced breaker members 513, which may be all straight, or have pointed ends, or have square ends, or which may be straight or curved in the direction of motion or which may have straight and curved portions. The ends 514 of the spikes 513 may be suitably pointed to enhance the breaking action upon the high consistency wood pulp introduced into the drum housing 511. The drum housing 511 is closed at each end by means of end walls 550, 551 containing bearings 552, 553 in order to support the hollow shaft 512. The drum housing 511 is provided with a plurality of longitudinally spaced, circumferentially extending, slots 515 covering approximately the lower half of the circumference thereof, separated by a plurality of longitudinally spaced, circumferentially extending parallel, grate-like lands 558. These grate-like lands are provided in a flattened bottom portion of the drum housing 511, extending from point C in the third quadrant to point D in the fourth quadrant (as seen in FIG. 6). The slope of grate-like lands 558 is about 25–35° to the horizontal.

Welded to the third quadrant of the drum housing 511 is a generally rectangular main plate 561 provided with a flange 562, and similarly, welded to the fourth quadrant of the drum housing 511 is a generally rectangular auxiliary plate 563 provided with a flange 564. There is thus defined between plates 561, 563 a discharge chute 525.

The housing 511 has an opening 520 at the top thereof to receive a feed spout 521 which extends substantially the full length of the housing 511.

The hollow shaft 512 is attached to a gaseous reagent feed line 523, which is provided with a metering valve 524, by means of rotary seal 566. The hollow shaft is also provided with a plurality of longitudinally and circumferentially spaced reagent feed apertures 522. This feed means provides intimate contact of the gaseous reagent with the pulp as it is being fluffed.

While not shown in the drawings, the discharge chute 525 is connected to discharge 25 as in FIGS. 1 and 2 which is also provided with a conventional discharge device 26 to provide a seal against the free escape of reagent gas. Although device 26 is shown to be a rotary valve, any equivalent device which will provide a sealing action may be substituted therefor.

The dimensions of the apparatus and of all its parts will vary with the throughput of treated pulp required and have been described with reference to FIGS. 1 and 2 and will not be repeated here.

The speed of rotation of the shaft 512 and spikes 513 should be such that the linear peripheral speed of the tips 514 of the spikes 513 will be sufficient to effect the desired comminution action, which will depend on the pulp being treated, but will usually be in the range 1,500 feet per minute to about 6,000 feet per minute.

In operation, the pulp to be comminuted is fed via the spout 521 in the form of a continuous web, cakes, sheets or large fragments in the housing 511. As the pulp enters the housing 511 although unsupported, its inertia is such that only a small portion thereof can accelerate sufficiently rapidly to be carried along at the speed of the tips 514 of the spikes 513.

The spikes 513 therefore tear through the pulp carrying forward only a small quantity at their own speed. Although by virtue of this same inertia some compaction of the pulp occurs at the point of impact of the spikes 513, since the pulp is unsupported, this compaction is slight and unobjectionable. Substantially simultaneously with the tearing action by the spikes 513, there is the reaction on the comminuted pulp by the gaseous reagent fed through line 523.

The substantial simultaneous reaction and comminuting action on the pulp is extremely important in the process of the present invention and the fragments produced must be of low density and of uniformly porous structure and have undergone as little compaction as possible. In the prior apparatus, the pulp being supported on a fixed member at the moment of comminution or otherwise squeezed between coacting members is subjected to undesirable compaction and is unsuitable for uniform and rapid subsequent reaction with the gaseous reagent.

The cooperation between the breaker members 513 and the slotted outlet 525 is the same in this embodiment as has been described with reference to the embodiment shown in FIGS. 3 and 4.

The apparatus described above is suitable for effecting reaction between a solid and a gas where the time of reaction is very short, i.e., in the order of a few seconds or less and, in fact, preferably is substantially instantaneous.

Figure 7:
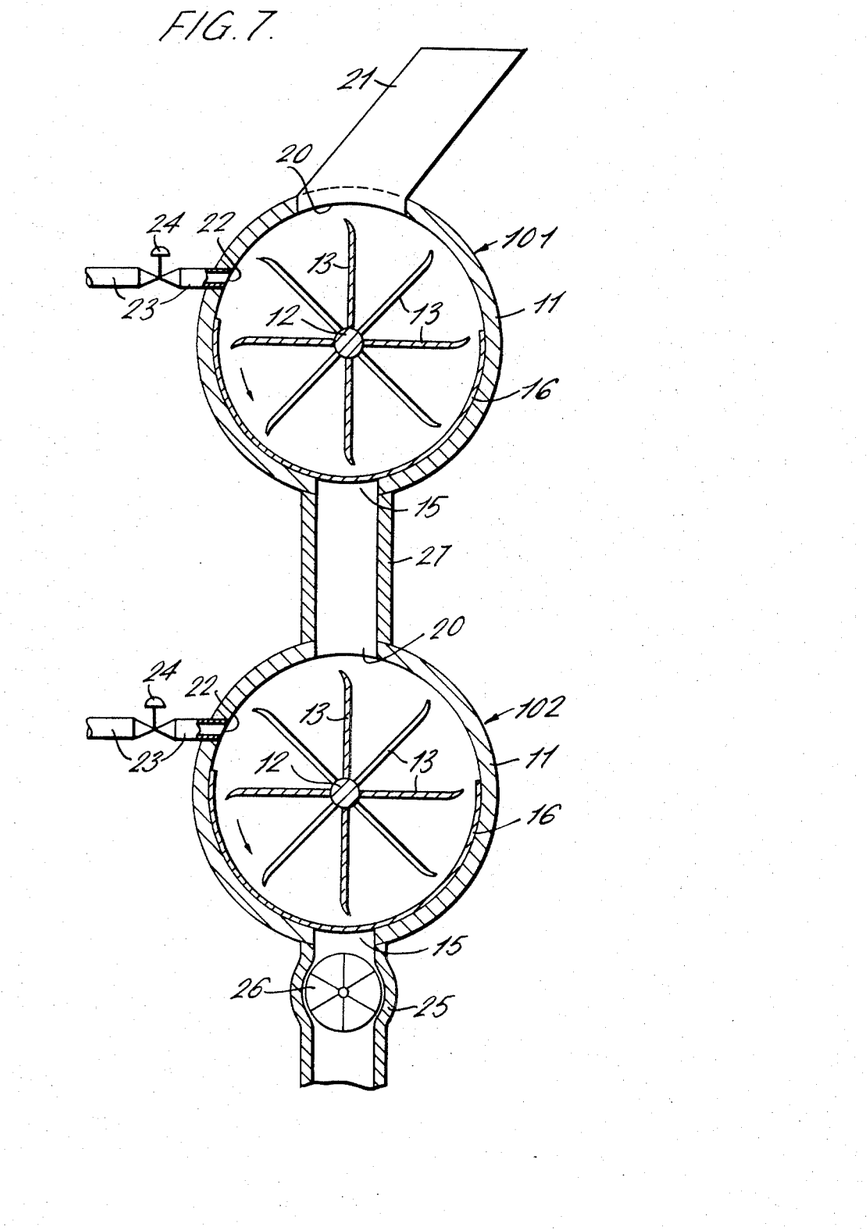
FIG. 7 is a central vertical section of an apparatus according to another embodiment of this invention for carrying out a process according to one aspect of this invention.

Turning now to FIG. 7, the apparatus there shown includes an upper comminution and reaction apparatus 101 and a lower comminuttion and reaction apparatus 102, interconnected by a connecting chute 27. Each of upper and lower comminution and reaction apparatus 101, 102 includes the drum housing 11, the shaft 12, the spikes 13, the slots 15, 17, the sleeve 16, the gaseous reagent inlet 23 entering the drum housing 11 through aperture 22 and the metering valve 24. However, the upper apparatus 101 includes the pulp inlet spout 21 and the discharge through slots 15 to the connecting chute 27. Consequently, lower apparatus 102 is fed with pulp from connecting chute 27. Reacted pulp discharges through rotary valve 26 in discharge chute 25.

Figure 8:
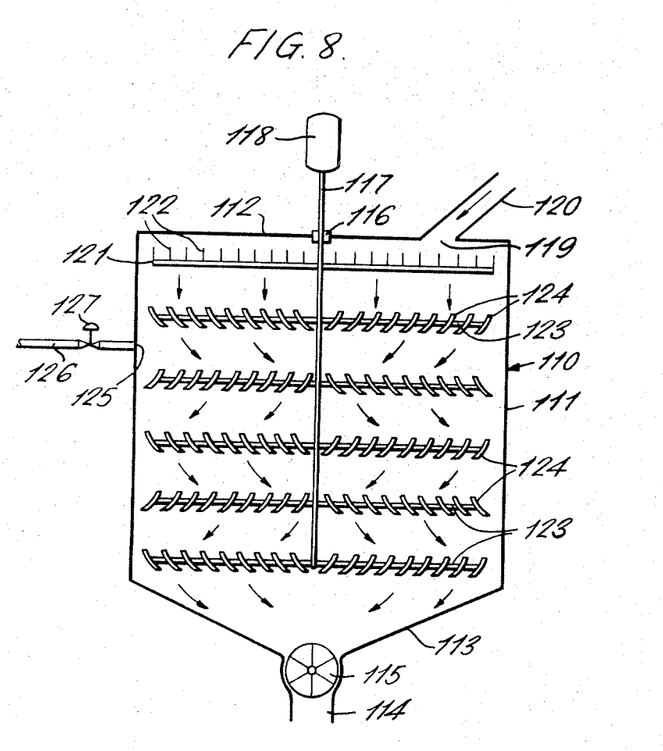
FIG. 8 is a central vertical section of an apparatus according to yet another embodiment of this invention, for carrying out a process according to one aspect of this invention.

The apparatus is conveniently used if it is desirable to preheat the solid in the absence of the reagent gas, then to contact the preheated solid with the reagent gas. In the upper unit 101, the solid is comminuted and preheated by steam or other gas or vapour at a high temperature introduced through line 23 to inlet aperture 22. The preheated solid is then passed via connecting chute 27 to the lower unit 102 where it is maintained in agitation and may be further comminuted and where it is contacted with the reagent gas introduced through line 23 to inlet aperture 22. The reacted pulp is discharged via cooling discharge device 26.

Where the reaction time required is more than a few seconds, the apparatus shown in FIG. 8 may be used.

The apparatus 110 includes a vertically disposed cylinder 111 provided with a cover 112 and a conical bottom 113 terminating in a discharge chute 114 provided with a discharge device 115, which may be a rotary valve, which serves as a seal against the free escape of reagent gas. The cover is pierced by a central axial hole fitted with a conventional sealing bushing 116 to accommodate a shaft 117 driven by motor 118. Also mounted in a feed aperture 119 in the cover 112 is an inclined pulp inlet spout 120, similar to spout 21 in FIGS. 1–3. Near the top of the vessel 111 and splined onto shaft 117 is a plurality of radial arms 121, each provided with a plurality of upstanding spikee 122. Arms 121 and spikes 122 act as a comminuting device to reduce the solid, fed into the vessel 111 in lump or ribbon form through the inlet spout 120, to porous, uncompacted fibre aggregates. These aggregates fall by gravity and meet a vertically spaced-apart series of arms 121 secured to central shaft 117. Each series of arms 121 comprises a plurality of radial spokes 123 on each of which are mounted a plurality of vanes 124 inclined to its associated spoke 123. The vanes 124 extend both above and below the plane of the arm 121. The inclination of vanes 124 to the axes of spokes 123 is reversed in each succeeding set of spokes 123 so that the falling aggregates are propelled alternately towards the center and towards the periphery of vessel 111. In this fashion, the path of the aggregates in their fall from the top to the bottom of the vessel 111 is increased several-fold, their rate of fall retarded and, therefore, their dwell-time in the vessel increased. It is noted that comminution arm 121 and guiding arm 123 each are caused to rotate by the motor 118.

The reagent gas may be introduced into vessel 111 at any suitable point. One such point is through inlet aperture 125 in the side wall of the vessel 111 via inlet line 126 provided with a metering valve 31. Alternatively, or in conjunction therewith, it may be fed through shaft 117, which may be below and provided with outlet apertures, and suitable means, such as a rotary seal for admitting the gaseous reagent to the hollow shaft. The reagent gas may be introduced in the pure state or diluted with air, steam or another inert gas or vapour, or the diluent gas or vapour may be introduced into vessel 111 at a different point or points.

Reverting to FIG. 7 for a moment, in cases where a longer reaction time is desired than is provided during passage of the solid through lower unit 102, such lower unit may be replaced by the apparatus of FIG. 8.

(3) Description of examples of the invention

The following are examples of the process of embodiments of this invention performed with the apparatus of FIGS. 1–6.

EXAMPLE 1

An unbleached kraft pulp from coniferous wood characterized by a Roe Chlorine No. 5.4, Kappa No. 34.1 and a 0.5 percent cupriethylenediamine viscosity of 34.5 after acid chlorite treatment, was treated with gaseous chlorine at 32° C. for one minute; the pulp was then washed, pressed to 30 percent consistency and shredded. One portion of the treated pulp was placed in a tower, tower and contents preheated to 100° C. by direct steaming. An ammonia-steam mixture containing 1.5 percent ammonia on the weight of dry fibre was passed upwardly through the pulp for a contact period of 1 minute. The pulp was then washed. Characteristics of the extracted pulp were: Kappa No. 6.9, CED viscosity 32.5 cps.

A second portion of the treated and shredded pulp was preheated to 60° C., and then passed into the apparatus of FIG. 3 which further comminuted the pulp and where two ammonia extracting agents, namely (1) an ammonia-steam hot air mixture, and (2) an ammonia-hot air mixture, each containing 1.5 percent ammonia on the weight of dry fibre were added to different portions of pulp for a contact period which was in the order of a fraction of one second for each agent. Immediately after the contact period, each portion of the pulp was dropped into water and washed. Characteristics of each of the extracted pulp portions at 60° C. were: Kappa No. 10.9, CED viscosity 32.6 cps.

A third portion of the same chlorinated washed pulp was preheated at 80° C. and then passed into an apparatus which further comminuted the pulp and where two ammonia extracting agents, namely (1) an ammonia-steam mixture and (2) an ammonia-hot air mixture, each containing 1.5 percent ammonia on the weight of dry fibre were added to different portions of the pulp for a contact period which was in the order of a fraction of one second for each agent. Immediately after the contact period, each portion of the pulp was dropped into water and washed. Characteristics of each of the extracted pulp portions at 80° C. were: Kappa No. 8.0, CED viscosity 32.6 cps.

A fourth portion of the same chlorinated washed pulp was preheated to 100° C. by direct steaming tnd then passed into an apparatus which further comminuted the pulp where an ammonia-steam mixture containing 1.5 percent ammonia on the weight of dry fibre was added to the pulp for a contact period which was in the order of a fraction of one second. Immediately after the contact period the pulp was dropped into water and washed. Characteristics of the extracted pulp at 100° C. were: Kappa No. 6.6, CED viscosity 32.5 cps.

Since the Kappa number of a pulp is a measure of the residual unreacted lignin, the example above clearly illustrates that with a preheated pulp, (a) simultaneous comminution and reaction of the solid with the gas achieves substantially more rapid reaction and that (b) there is an effect of temperature on the rate of reaction.

In the above example, the desired results were obtained by simultaneous comminuting and reaction of the solid and gas by contacting the solid with a mixture of steam and reagent gas.

EXAMPLE 2

An unbleached kraft pulp from coniferous wood characterized by a Roe Chlorine No. 5.4, Kappa No. 34.1 and a 0.5 percent cupriethylenediamine viscosity of 34.5 after acid chlorite treatment was treated with gaseous chlorine at 32° C. for one minute; the pulp was then washed, pressed to 30 percent consistency and shredded. The shredded chlorinated and washed pulp was preheated to 100° C. by direct steaming and then passed into an apparatus which further comminuted the pulp where an ammonia-steam mixture containing 1.5 percent ammonia on the weight of dry fibre was added to the pulp for a contact period which was in the order of a fraction of one second. Immediately after the contact period the pulp was dropped into water and washed. Characteristics of the extracted pulp at 100° C. were: Kappa No. 6.6, CED viscosity 32.5 cps. The chlorinated, extracted and washed pulp was pressed to 35 percent consistency. The pressed pulp was sprayed with a solution containing sodium carbonate (1 percent $Na_2CO_3$ on O.D. pulp) and water sufficient to reduce the pulp consistency to 30 percent.

The pulp was then shredded into fibre and fibre aggregates, one portion of the pulp placed in a tower, and tower and contents preheated to 100° C. by direct steaming. Chlorine dioxide diluted with steam to a partial pressure of 15 torr was passed into the tower until 1.0 percent $ClO_2$ on pulp O.D. basis was passed into the tower for eight minutes. The pulp was held at 100° C. for 30 minutes. Unreacted chlorine dioxide was removed from the tower by aeration and determined analytically and the chlorine dioxide consumed amounted to 0.92 percent $ClO_2$ on pulp, O.D. basis. The final pH of the moist, bleached pulp was 5.2. A portion of the bleached pulp was washed, air dried, and the brightness and CED viscosity were measured. Elrepho brightness was 84.3 percent; 0.5 CED viscosity was 30.1 cps.

A second portion of the shredded pulp was preheated to 100° C., and then passed into the apparatus of FIG. 3 which further comminuted the pulp and where gaseous chlorine dioxide diluted with steam to a partial pressure of 15 torr was added to the pulp for a contact period which was in the order of a fraction of one second (1.0 percent $ClO_2$ on pulp O.D. basis was supplied to the pulp in this treatment). Immediately after the contact period the pulp was dropped into a retention vessel in which the pulp was held for 30 minutes. Unreacted chlorine dioxide was removed from the tower by aeration and determined analytically and the chlorine dioxide consumed amounted to 0.93 percent $ClO_2$ on pulp O.D. basis. The final pH of the moist, bletched pulp was 5.2. A portion of the bleached pulp was washed, air dried, and the brightness and the CED viscosity were measured. Elrepho brightness was 84.7 percent; 0.5 percent CED viscosity was 30.2 cps. In the above example, the desired result was obtained by simultaneously comminuting the pulp and effecting substantially instantaneous absorption of the chlorine dioxide by the pulp.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and condiitons. Consequently, such changes and modifications are properly, equitably, and intended to be, within the full range of equivalence of the following claims.

We claim:

1. In a substantially instantaneous reaction between chemical and gaseous $NH_3$ or gaseous $ClO_2$, the improved process which comprises:

(a) introducing said pulp into an apparatus comprising: a cylindrical housing; a rotating shaft longitudinally and rotatably mounted in said housing, said shaft having a plurality of longitudinally spaced-apart breaker members extending therefrom; pulp inlet means for introducing said pulp into said housing adjacent the top thereof; inlet means for introducing said gaseous reagent into a fluffing zone in said housing adjacent said breaker members; and outlet means for removal of comminuted reacted fluffed pulp adjacent the bottom thereof, a portion of the bottom of said housing which provides said outlet means being flattened to represent, in cross-section, the chord of a circle, said flattened portion being provided with a plurality of longitudinally spaced slots extending circumferentially around the bottom of said housing, said breaker members extending radially outwardly beyond said spaced slots, said pulp being introduced for substantially free-falling linear movement in the same direction as the linear peripheral movement of the breaker members, but at a velocity less than the linear peripheral velocity of said breaker members;

(b) introducing said gaseous reagent into said fluffing zone;

(c) substantially simultaneously (i) comminuting said pulp so as to have a low density, substantially uncompacted, porous, fluffed structure and (ii) contacting said pulp with said gaseous reagent in said fluffing zone at said first area of contact between said breaker members and said free-falling pulp where both said pulp and said breaker members are moving linearly downwardly; and (d) discharging said reacted pulp from said apparatus by cooperation between said spaced apart breaker members and said slotted outlet means while substantially inhibiting the restraining of the pulp while the pulp is initially being contacted with the breaker members, thereby to minimize the production of compacted pulp material.

2. The process of claim 1 wherein said pulp has a high consistency of more than 15%.

3. A process as claimed in claim 2 in which the pulp has a consistency between 15 and 60%.

4. The process of claim 2 wherein said gaseous reagent is $ClO_2$ applied to the multi-stage bleaching of said pulp.

5. The process as claimed in claim 4 in which said $ClO_2$ is diluted with steam or a non-reactive gas to a partial pressure of chlorine dioxide which is not more than 100 mm. of Hg.

6. A process as claimed in claim 2 applied to the extraction of a pretreated fluffed pulp by contact with gaseous ammonia.

7. The process of claim 6 wherein said ammonia is diluted with steam, air or other diluent gas.

8. The process of claim 2 wherein said low density, substantially uncompacted, porous fluffed pulp is composed of fiber aggregates or flocks, each of which is an average of 1/8" to 1" in diameter and which presents a fluffed-up dried appearance even with about 40–80% moisture in the cellulosic pulp.

9. The process of claim 8 wherein said low density, substantially uncompacted porous fluffed pulp has a density of 5–15 lb. per ft.$^3$ at 30% consistency.

10. An apparatus for substantially simultaneously comminuting a cellulosic fibrous pulp to form particles of a fluffed pulp having a low density, substantially uncompacted structure and reacting said fluffed pulp with a gaseous reagent, said apparatus comprising: a cylindrical housing; a shaft longitudinally and rotatably mounted in said housing, said shaft having a plurality of longitudinally spaced-apart breaker members extending therefrom; pulp inlet means for introducing said pulp into said housing adjacent the top thereof; inlet means for introducing said gaseous reagent into said housing adjacent said breaker members; and outlet means for removal of comminuted reacted fluffed pulp adjacent the bottom thereof, a portion of the bottom of said housing providing said outlet means being flattened to represent, in cross-section, the chord of a circle, said flattened portion being provided with a plurality of longitudinally spaced slots extending circumferentially around the bottom of said housing, said breaker members extending radially outwardly beyond said spaced slots, said spaced-apart breaker members co-operating with said slotted outlet means to discharge the reacted pulp from the apparatus while substantially inhibiting the restraining of the pulp while the pulp is initially being contacted with the breaker members, thereby to minimize the production of compacted pulp material.

11. An apparatus as claimed in claim 10 in which the pulp inlet means comprises a spout extending substantially the full length of the housing.

12. The apparatus as claimed in claim 10 wherein the line representative of the chord of a circle extends at an angle of about 25–35° to the horizontal.

13. The apparatus as claimed in claim 10 in which the width of the slots is adjustable by means of a sleeve member located adjacent the bottom of said housing, said sleeve member being mounted on said housing by structure enabling movement longtiudinally of said housing, said sleeve member having a plurality of longitudinally spaced slots therein arranged to co-operate with the slots in said housing.

14. An apparatus for substantially simultaneously comminuting a cellulosic fibrous pulp to form particles of a fluffed pulp having a low density, substantially uncompacted structure and reacting said fluffed pulp with a gaseous reagent, said apparatus comprising: a horizontally disposed cylindrical housing; a shaft longitudinally and rotatably mounted in said housing, said shaft having a plurality of longitudinally spaced breaker members extending therefrom; pulp inlet means for introducing said pulp into said housing adjacent the top thereof for substantially free-falling linear movement in the same direction as the linear peripheral movement of the breaker members, but at a velocity less than the liner peripheral velocity of said breaker members; inlet means for introducing said gaseous reagent into said housing adjacent said breaker members in a fluffing zone region of said apparatus at said first area of contact between said breaker members and said free-falling pulp where both said pulp and said breaker members are moving linearly downwardly; and outlet means for removal of comminuted reacted fluffed pulp adjacent the bottom thereof, a portion of the bottom of said housing which provides said outlet means being in the form of a relatively large opening, said opening being fitted with a plurality of spaced-apart grate bars, thereby to provide a plurality of longitudinally spaced slots extending circumferentially around the bottom portion of said housing, such breaker members extending radially outwardly through said slots beyond said grate bars, said outet means co-operating with said spaced-apart breaker member substantially to inhibit the restraining of the pul while the pulp is being contacted with the breaker members, thereby to minimize the production of compacted pulp material.

15. The apparatus as claimed in claim 14 wherein the grate bars include structure operable to adjust the grate bars vertically with respect to the outlet means.

16. The apparatus as claimed in claim 14 wherein said grate bars extend aolng a line representtaive of the chord of a circle, said line extending at an angle of about 25–35° to the horizontal.

17. The apparatus as claimed in claim 10 wherein said reacted comminuted pulp outlet discharges into the pulp inlet means of a second and similar apparatus, connected in series therewith.

18. The apparatus as claimed in claim 10 wherein said rotatable shaft is hollow and is provided with gaseous reagent inlet means thereinto and with a plurality of longitudinally and circumferentially spaced-apart outlet apertures.

19. The apparatus as claimed in claim 10 wherein said outlet means includes means for providing a seal against the free escape of reagent gas.

References Cited

UNITED STATES PATENTS

| | | | |
|---|---|---|---|
| 3,492,199 | 1/1970 | Kindron et al. | 162—100 |
| 3,074,892 | 1/1963 | Strong | 162—66 |
| 2,649,371 | 8/1953 | Reid | 162—261 |
| 2,440,927 | 5/1948 | Boss et al. | 241—89 |
| 2,794,438 | 6/1957 | Heth | 241—89 |
| 1,827,710 | 10/1931 | Leyst-köchenmiester | 162—24 |
| 2,431,418 | 11/1947 | Hill | 162—17 |
| 2,717,195 | 9/1955 | Armstrong | 162—26 X |
| 3,467,574 | 9/1969 | West | 162—26 X |

S. LEON BASHORE, Primary Examiner

A. L. CORBIN, Assistant Examiner

U.S. Cl. X.R.

162—23, 26, 63, 67, 236, 246; 242—57, 188; 259—7